Aug. 12, 1958     L. L. HOWARD ET AL     2,847,370
METHOD OF ORNAMENTATION
Filed Sept. 18, 1956
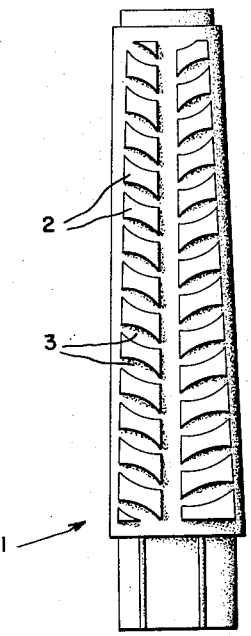
FIG. 1.
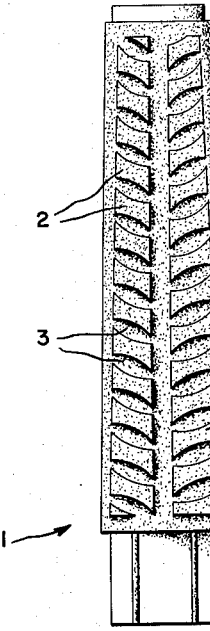
FIG. 2.
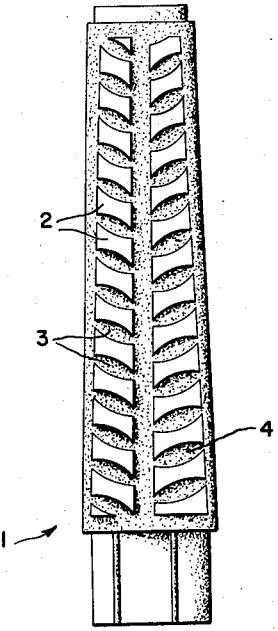
FIG. 3.
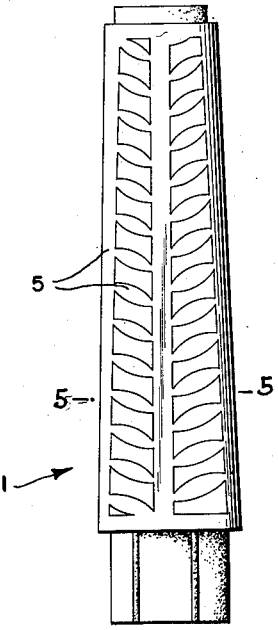
FIG. 4.
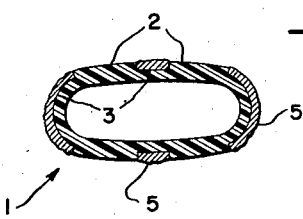
FIG. 5.
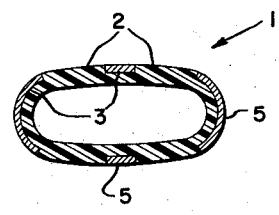
FIG. 6.
INVENTORS
LEONARD L. HOWARD
C. MAXWELL TYLER
BY 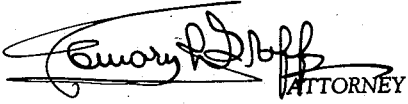
ATTORNEY

2,847,370
Patented Aug. 12, 1958

2,847,370
METHOD OF ORNAMENTATION

Leonard L. Howard and Charles Maxwell Tyler, Crisfield, Md., assignors to Chas. D. Briddell, Inc., Crisfield, Md., a corporation of Maryland Application September 18, 1956, Serial No. 610,565

1 Claim. (Cl. 204—18)

This invention relates to a method of ornamenting plastic articles by application of a metallic inlay thereto.

One method of achieving a similar ornamental effect includes steps for forming an embossed overlay of metal on a smooth surfaced plastic article, thereby providing a metallic design which is formed on top of and is higher than the plastic base.

This overlay method of ornamenting, in addition to involving the use of more or less complicated steps, has the disadvantage that it does not anchor or secure the metallic overlay to the plastic with sufficient firmness to prevent the overlay from scuffing or peeling off when subjected to ordinary and necessary handling such as is the case, for example, with ornamented handles of cutlery.

It is an object of the present invention to overcome these disadvantages by providing a plastic article decorated with a metallic inlay as distinguished from an overlay which provides a smooth external surface since both plastic and metal are co-planar thereby eliminating relatively sharp edges which tend to scuff and often peel off. In other words, by the present invention an ornamentation is embedded in appropriate cavities to provide alternate metallic and plastic surfaces all in the same plane.

Another object is to provide a metallic decorated plastic article which gives a pleasing appearance of being a unitary molded article.

Other objects will be apparent from the following specification and claim.

In the drawing:

Fig. 1 is a plan view of one side of a plastic cutlery handle with a design molded therein.

Fig. 2 is a plan view of the handle after being sprayed with a conductive coating.

Fig. 3 is a plan view showing the conductive coating removed from the tops of the embossed surfaces or ridges.

Fig. 4 is a plan view showing the handle after the electroplating step.

Fig. 5 is a sectional view on the line 5—5 of Fig. 4 indicating electrodeposited metal in the cavities.

Fig. 6 is a view similar to Figure 5 illustrating the handle after the buffing operation.

Referring to the drawings in detail, 1 indicates a cutlery handle having a design formed therein which presents a surface of raised areas or ridges 2 and intervening cavities 3.

After the article is formed as, for example by molding, the next step in preparing the article to be ornamented is to spray it with a coating of fine particles of a base metal, such as silver, mixed in a vehicle consisting of a conductive material capable of transferring electrical current. The coating thus sprayed on the article is indicated by the numeral 4 in Fig. 2. We have found it desirable to dilute the vehicle with a suitable thinner such as butyl acetate, however, any other appropriate thinner may be used.

Following the spraying operation, the article is subjected to a predetermined drying cycle which we have found to be approximately twelve hours at room temperature. The drying cycle could quite conceivably be hastened by subjecting the article to heat treatment in a low temperature oven, however, we have found that better adherence of the base coating to the plastic is attained by a slow drying process.

After the base metal coating has thoroughly dried, said coating is removed from the ridges 2 by brushing, sanding or buffing, leaving the cavities 3 containing the conductive coating.

The article is then placed in an electroplating bath and plated to the desired thickness by electro-deposition of a metal inlay 5, such as silver, on the base metal in the cavities. The ridges having had the base coating removed therefrom, would not attract the metal being deposited and would remain free thereof.

It has been found that, following the electroplating operation, the metal inlay 5 deposited on the article may not be evenly applied, therefore the next step is to subject the article to an additional buffing operation where an abrasive belt or wheel is used to remove any irregularities and buff both the plastic and metal surfaces to form a smooth surface.

If desired, the article may then be further buffed and a protective finish applied thereto by lacquering or further electroplating.

Although we have described our invention as applied to a molded plastic article, the complete process would be equally applicable to a plastic article having an uneven surface made by etching or scarifying the same so as to provide a surface of ridges and cavities.

We claim:

A method of ornamenting a plastic article with a metallic inlay consisting of molding a portion of the design in the plastic article to produce ridges and cavities in the surface thereof, directly spraying the entire plastic surface of the article with a vehicle containing a conductive base metal, drying and removing said vehicle from the sprayed article, removing the conductive base metal from the ridges by buffing, subjecting the article to an electroplating bath containing a metallic salt so as to deposit the metal in the cavities of the article, removing the article from the bath when the metal is plated to the desired thickness, abrading the article to bring the plastic and metal portions to a smooth surface finish, and finally buffing the article and applying a protective coating thereto.

References Cited in the file of this patent

UNITED STATES PATENTS

| | | |
|---|---|---|
| 2,279,567 | Holman | Apr. 14, 1942 |
| 2,506,165 | Mountcastle | May 2, 1950 |
| 2,529,086 | Law | Nov. 7, 1950 |
| 2,642,390 | Garofano | June 16, 1953 |
| 2,650,900 | Holman | Sept. 1, 1953 |
| 2,702,270 | Donahue et al. | Feb. 15, 1955 |